(12) United States Patent
Zhang (10) Patent No.: US 11,245,282 B2
(45) Date of Patent: Feb. 8, 2022

(54) MODULAR UPS AND WORKING METHOD OF MODULAR UPS

(71) Applicant: Huawei Technologies Co., Ltd., Shenzhen (CN)

(72) Inventor: Chuntao Zhang, Dongguan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 203 days.

(21) Appl. No.: 16/426,922

(22) Filed: May 30, 2019

(65) Prior Publication Data

US 2019/0280520 A1 Sep. 12, 2019

Related U.S. Application Data

(63) Continuation of application No. PCT/CN2017/113410, filed on Nov. 28, 2017.

(30) Foreign Application Priority Data

Nov. 30, 2016 (CN) .......................... 201611084155.3

(51) Int. Cl.
*H02J 9/06* (2006.01)
*H02J 3/38* (2006.01)
*H02J 9/00* (2006.01)

(52) U.S. Cl.
CPC ............... *H02J 9/061* (2013.01); *H02J 3/38* (2013.01); *H02J 9/005* (2013.01); *H02J 9/062* (2013.01); *H02J 9/007* (2020.01)

(58) Field of Classification Search
CPC .... H02J 9/061; H02J 9/062; H02J 3/38; H02J 9/005; H02J 9/007
See application file for complete search history.

(56) References Cited

U.S. PATENT DOCUMENTS

| | | |
|---|---|---|
| 2012/0306274 A1 | 12/2012 | Shetler, Jr. et al. |
| 2013/0154377 A1 | 6/2013 | Isomura |
| 2015/0263546 A1 | 9/2015 | Senoo |
| 2015/0372486 A1 | 12/2015 | Totani et al. |
| 2016/0181861 A1* | 6/2016 | Familiant ................. H02J 9/06 307/66 |
| 2016/0204654 A1 | 7/2016 | Mondal et al. |
| 2016/0329739 A1 | 11/2016 | Tseng et al. |
| 2016/0334821 A1 | 11/2016 | Lee et al. |

FOREIGN PATENT DOCUMENTS

| | | |
|---|---|---|
| CN | 103683270 A | 3/2014 |
| CN | 105529699 A | 4/2016 |
| CN | 106849325 A | 6/2017 |
| EP | 1713155 A1 | 10/2006 |
| GN | 103166301 A | 6/2013 |
| JP | 2013223402 A | 10/2013 |

\* cited by examiner

*Primary Examiner* — Daniel Cavallari
(74) *Attorney, Agent, or Firm* — Leydig, Voit & Mayer, Ltd.

(57) ABSTRACT

A working method of a modular uninterruptible power supply (UPS) includes: obtaining working parameters of the modular UPS, where the working parameters include an input voltage parameter, a load parameter, and a battery parameter; and adjusting a working mode of a power module in the modular UPS according to at least one of the working parameters of the modular UPS, so that not all power modules are in a same working mode, where the modular UPS includes K working modules, and 2≤K.

18 Claims, 7 Drawing Sheets

| Obtain working parameters of a modular UPS, where the working parameters include an input voltage parameter, a load parameter, and a battery parameter | 31 |

| Adjust a working mode of a power module in the modular UPS according to at least one of the working parameters of the modular UPS, so that not all power modules are in a same working mode | 32 |

MODULAR UPS AND WORKING METHOD OF MODULAR UPS

CROSS-REFERENCE TO RELATED APPLICATIONS

This application is a continuation of International Application No. PCT/CN2017/113410, filed on Nov. 28, 2017, which claims priority to Chinese Patent Application No. 201611084155.3, filed on Nov. 30, 2016. The disclosures of the aforementioned applications are hereby incorporated by reference in their entireties.

TECHNICAL FIELD

The present disclosure relates to the electric power field, and in particular, to a modular uninterruptible power supply (UPS) and a working method of a modular UPS.

BACKGROUND

An uninterruptible power supply (UPS) is a device that can take over a mains supply to keep supplying electric power when the mains supply fails. The emergence of UPSs greatly improves reliability of electricity usage of a user, and avoids a user loss caused by a power failure.

In recent years, modular UPSs are becoming increasingly popular due to advantages such as flexible configuration. A plurality of power modules are disposed in a modular UPS, and all the power modules perform an identical function. For example, all the power modules perform a function of mains power supply. However, this makes the power modules underutilized, resulting in resource waste.

SUMMARY

Embodiments of the present disclosure provide a modular UPS and a working method of a modular UPS, to fully utilize power modules in the modular UPS, and improve system performance.

In one aspect, a working method of a modular UPS is provided. The method includes: obtaining working parameters of the modular UPS; and adjusting a working mode of a power module in the modular UPS according to the working parameters of the modular UPS, so that not all power modules are in a same working mode.

The working modes include a battery power supply mode, a mains power supply mode, a feedback mode, and a charging mode.

In this embodiment of the present disclosure, it is considered to use the working parameters of the modular UPS to adjust the working mode of the power module, to ensure that not all power modules are in a same working mode. In this way, the power modules in the UPS can be utilized as required, so that the power modules in the modular UPS can be fully utilized, and utilization of the power modules is improved, thereby improving system performance of the modular UPS.

The working parameters may include an internal working parameter and an external working parameter. The internal working parameter may include a quantity of the power modules, and the external working parameter may include an input voltage parameter, a load parameter, a battery parameter, and the like. That is, during adjustment of the working mode of the power module in the modular UPS, at least one of the working parameters of the modular UPS may be considered, to adjust the working mode of the power module in the modular UPS.

In this embodiment of the present disclosure, the input voltage parameter that is an external working parameter may include a voltage amplitude and a voltage frequency, the battery parameter that is an external working parameter may include a remaining battery capacity, and the load parameter that is an external working parameter includes a load capacity and a load type. The working mode of the power module in the modular UPS may be flexibly adjusted by using only the external working parameter or by using both the quantity of the power modules and the external working parameter, to improve system performance.

Adjusting the working mode of the power module in the modular UPS by using only the external working parameter may include the following four scenarios.

In a first scenario, the input voltage parameter includes a voltage amplitude and a voltage frequency. Adjusting the working mode of the power module in the modular UPS by using the external working parameter of the modular UPS may include: determining whether the input voltage amplitude and the input voltage frequency meet a preset threshold; and when it is determined that at least one of the voltage amplitude or the voltage frequency does not meet the preset threshold, adjusting working modes of L power modules of K power modules in the modular UPS to the battery power supply mode. K is a total quantity of the power modules in the modular UPS, and $1 \leq L < K$. Generally, in China, a preset threshold of a mains supply voltage is 220 V, and a frequency is 50 Hz. In another country, a preset threshold of a mains supply voltage is a value specified by the country. A specific preset threshold is not specifically limited in the present disclosure, and is subject to an actual requirement. When at least one of the voltage amplitude or the voltage frequency does not meet the preset threshold, power supply reliability of a load can be ensured by adjusting the power modules to be in the battery power supply mode.

In a second scenario, the battery parameter includes a remaining battery capacity. Adjusting the working mode of the power module in the modular UPS by using the external working parameter of the modular UPS may include: determining whether the remaining battery capacity is less than a first threshold; and when it is determined that the remaining battery capacity is less than the first threshold, adjusting working modes of P power modules of K power modules in the modular UPS to the charging mode. K is a total quantity of the power modules in the modular UPS, and $1 \leq P < K$. When the remaining battery capacity is less than the first threshold, large-power charging can be implemented by adjusting the power modules to be in the charging mode, thereby shortening a charging time.

In a third scenario, the load parameter includes a load capacity. Adjusting the working mode of the power module in the modular UPS by using the external working parameter of the modular UPS may include: determining whether the load capacity is less than a second threshold; and when it is determined that the load capacity is less than the second threshold, adjusting working modes of Q power modules of K power modules in the modular UPS to the feedback mode. K is a total quantity of the power modules in the modular UPS, and $1 \leq Q < K$. When the load capacity is less than the second threshold, a cross current can be prevented by adjusting the power modules to be in the feedback mode, thereby improving parallel connection reliability of the power modules.

In a fourth scenario, the load parameter includes a load type, and the load type includes an energy feedback load. Adjusting the working mode of the power module in the modular UPS by using the external working parameter of the modular UPS may include: when it is determined that an output load is the energy feedback load, adjusting working modes of R power modules of K power modules in the modular UPS to the feedback mode or the charging mode. K is a total quantity of the power modules in the modular UPS, and 1≤R<K. When the output load is the energy feedback load, energy of the energy feedback load can be fed back to a power grid or to charge a battery by adjusting the power modules to be in the feedback mode or the charging mode, thereby fully utilizing resources and saving energy.

Adjusting the working mode of the power module in the modular UPS by using both the quantity of the power modules and the external working parameter may be specifically: when the quantity of the power modules is limited, preferentially ensuring power supply reliability of an output load. On this basis, an issue of charging a battery or preventing a cross current is then considered. Specifically, adjusting the working mode of the power module in the modular UPS according to the internal working parameter and the external working parameter of the modular UPS may be specifically: determining whether the voltage amplitude and the voltage frequency meet a preset threshold; when it is determined that at least one of the voltage amplitude or the voltage frequency does not meet the preset threshold, adjusting working modes of S power modules of K power modules in the modular UPS to the battery power supply mode, so that output of the modular UPS satisfies a power requirement of a load, where K is a total quantity of the power modules in the modular UPS, and 1≤S<K; on a basis of satisfying the power requirement of the load, determining whether a remaining power module other than a power module that provides power for the load exists in the modular UPS; and when the remaining power module exists in the modular UPS, executing the following step:

determining whether the battery capacity is less than a first threshold; and when the battery capacity is less than the first threshold, adjusting a working mode of at least one power module of the remaining power module to the charging mode; or determining whether the load capacity is less than a second threshold; and when the load capacity is less than the second threshold, adjusting a working mode of at least one power module of the remaining power module to the feedback mode; or determining whether an output load is an energy feedback load; and when the output load is the energy feedback load, adjusting a working mode of at least one power module of the remaining power module to the feedback mode or the charging mode.

Such a manner of adjusting the working mode of the power module in the modular UPS by using both the quantity of the power modules and the external working parameter may further implement fast battery charging or current return prevention on a basis of satisfying power supply reliability of the load, thereby fully satisfying an application requirement.

It should be noted herein that, in this specification, L, P, Q, R, and S are positive integers, values of L, P, Q, R, and S may be the same, and the present disclosure imposes no limitation thereto.

In this embodiment of the present disclosure, the power modules in the modular UPS may be initially set to be in the mains power supply mode. That is, the mains power supply mode may be a default working mode of the power modules. In addition, when the voltage amplitude and the voltage frequency are restored to meet the preset threshold, a power module in the battery power supply mode may be adjusted to be in the mains power supply mode; when the battery capacity is restored to be no less than the first threshold, a power module in the charging mode may be adjusted to be in the mains power supply mode; and when the load capacity is changed to be no less than the second threshold, a power module in the feedback mode may be adjusted to be in the mains power supply mode.

Certainly, in this embodiment of the present disclosure, if no remaining power module exists in the modular UPS, and when the voltage amplitude and the voltage frequency are restored to meet the preset threshold, the following step may be executed:

determining whether the battery capacity is less than the first threshold, and when the battery capacity is less than the first threshold, adjusting a working mode of at least one power module from the battery power supply mode to the charging mode; or determining whether the load capacity is less than the second threshold, and when the load capacity is less than the second threshold, adjusting a working mode of at least one power module from the battery power supply mode to the feedback mode; or determining whether the output load is the energy feedback load, and when the output load is the energy feedback load, adjusting a working mode of at least one power module from the battery power supply mode to the feedback mode or the charging mode.

That is, when the quantity of the power modules in the modular UPS is insufficient, on a basis of ensuring power supply reliability of the load, once a power module does not need to be in the battery power supply mode for power supply, one or more of such power modules may be adjusted as required, to better utilize advantages of the modes.

In addition, it should be noted that, a power module in the modular UPS provided in this embodiment of the present disclosure may be freely switched from one working mode to another as required. Specifically, a previous working mode of a power module that is adjusted to be in the battery power supply mode is the mains power supply mode, the charging mode, or the feedback mode; a previous working mode of a power module that is adjusted to be in the charging mode is the mains power supply mode, the battery power supply mode, or the feedback mode; and a previous working mode of a power module that is adjusted to be in the feedback mode is the mains power supply mode, the charging mode, or the battery power supply mode.

In another aspect, a modular UPS is provided, including power modules, a bypass module, and a control module. The control module is connected to the power modules and the bypass module. The control module is configured to obtain working parameters of the modular UPS; and adjust a working mode of a power module in the modular UPS according to the working parameters of the modular UPS, so that not all power modules are in a same working mode.

The working parameters include an internal working parameter and an external working parameter. The internal working parameter includes a quantity of the power modules, and the external working parameter includes an input voltage parameter, a load parameter, and a battery parameter. The control module may be specifically configured to adjust the working mode of the power module in the modular UPS according to at least one of the working parameters of the modular UPS.

Optionally, in one scenario, the input voltage parameter includes a voltage amplitude and a voltage frequency. The control module is specifically configured to: determine whether the voltage amplitude and the voltage frequency meet a preset threshold; and when it is determined that at least one of the voltage amplitude or the voltage frequency does not meet the preset threshold, adjust working modes of L power modules of K power modules in the modular UPS to a battery power supply mode. K is a total quantity of the power modules in the modular UPS, and $1 \leq L < K$.

Optionally, in one scenario, the battery parameter includes a remaining battery capacity. The control module is specifically configured to: determine whether the remaining battery capacity is less than a first threshold; and when it is determined that the remaining battery capacity is less than the first threshold, adjust working modes of P power modules of K power modules in the modular UPS to a charging mode. K is a total quantity of the power modules in the modular UPS, and $1 \leq P < K$.

Optionally, in one scenario, the load parameter includes a load capacity. The control module is specifically configured to: determine whether the load capacity is less than a second threshold; and when it is determined that the load capacity is less than the second threshold, adjust working modes of Q power modules of K power modules in the modular UPS to a feedback mode. K is a total quantity of the power modules in the modular UPS, and $1 \leq Q < K$.

Optionally, in one scenario, the load parameter includes a load type. The load type includes an energy feedback load. The control module is specifically configured to: when it is determined that an output load is the energy feedback load, adjust working modes of R power modules of K power modules in the modular UPS to a feedback mode or a charging mode. K is a total quantity of the power modules in the modular UPS, and $1 \leq R < K$.

Optionally, in one scenario, the input voltage parameter includes a voltage amplitude and a voltage frequency, the battery parameter includes a remaining battery capacity, and the load parameter includes a load capacity and a load type.

The control module is specifically configured to: determine whether the voltage amplitude and the voltage frequency meet a preset threshold; and when it is determined that at least one of the voltage amplitude or the voltage frequency does not meet the preset threshold, adjust working modes of S power modules of K power modules in the modular UPS to a battery power supply mode, so that output of the modular UPS satisfies a power requirement of a load, where K is a total quantity of the power modules in the modular UPS, and $1 \leq S < K$; and determine whether a remaining power module other than a power module that satisfies the power requirement of the load exists in the modular UPS; and when the remaining power module exists in the modular UPS, execute the following step:

determining whether the battery capacity is less than a first threshold; and when the battery capacity is less than the first threshold, adjusting a working mode of at least one power module of the remaining power module to a charging mode; or determining whether the load capacity is less than a second threshold; and when the load capacity is less than the second threshold, adjusting a working mode of at least one power module of the remaining power module to a feedback mode; or determining whether the output load is an energy feedback load; and when the output load is the energy feedback load, adjusting a working mode of at least one power module of the remaining power module to a feedback mode or a charging mode.

It should be noted herein that, in this specification, L, P, Q, R, and S are positive integers, values of L, P, Q, R, and S may be the same, and the present disclosure imposes no limitation thereto.

Optionally, in one scenario, the power modules in the modular UPS are initially in a mains power supply mode, and the control module is further configured to: when the voltage amplitude and the voltage frequency are restored to meet the preset threshold, adjust a power module in the battery power supply mode to be in the mains power supply mode; when the battery capacity is restored to be no less than the first threshold, adjust a power module in the charging mode to be in the mains power supply mode; and when the load capacity is changed to be no less than the second threshold, adjust a power module in the feedback mode to be in the mains power supply mode.

Optionally, in this embodiment of the present disclosure, a previous working mode of a power module that is adjusted to be in the battery power supply mode is the mains power supply mode, the charging mode, or the feedback mode;

a previous working mode of a power module that is adjusted to be in the charging mode is the mains power supply mode, the battery power supply mode, or the feedback mode; and a previous working mode of a power module that is adjusted to be in the feedback mode is the mains power supply mode, the charging mode, or the battery power supply mode.

Optionally, if no remaining power module exists in the modular UPS, the control module may be further configured to:

when the voltage amplitude and the voltage frequency are restored to meet the preset threshold, execute the following step:

determining whether the battery capacity is less than the first threshold, and when the battery capacity is less than the first threshold, adjusting a working mode of at least one power module from the battery power supply mode to the charging mode; or determining whether the load capacity is less than the second threshold, and when the load capacity is less than the second threshold, adjusting a working mode of at least one power module from the battery power supply mode to the feedback mode; or determining whether the output load is the energy feedback load, and when the output load is the energy feedback load, adjusting a working mode of at least one power module from the battery power supply mode to the feedback mode or the charging mode.

According to the modular UPS and the working method of the modular UPS provided in embodiments of the present disclosure, the working mode of the power module in the modular UPS is adjusted according to the working parameters, so that not all power modules are in a same working mode. In this way, the power modules in the modular UPS can be fully utilized, thereby improving system performance of the modular UPS.

BRIEF DESCRIPTION OF DRAWINGS

To describe technical solutions in embodiments of the present disclosure more clearly, the following briefly describes the accompanying drawings. The accompanying drawings in the following description show merely some embodiments of the present disclosure, and a person of ordinary skill in the art may still derive other drawings from these accompanying drawings without creative efforts.

DESCRIPTION OF EMBODIMENTS

To make objectives, technical solutions, and advantages of the present disclosure clearer, the following further describes embodiments of the present disclosure in detail with reference to the accompanying drawings.

Figure 1:
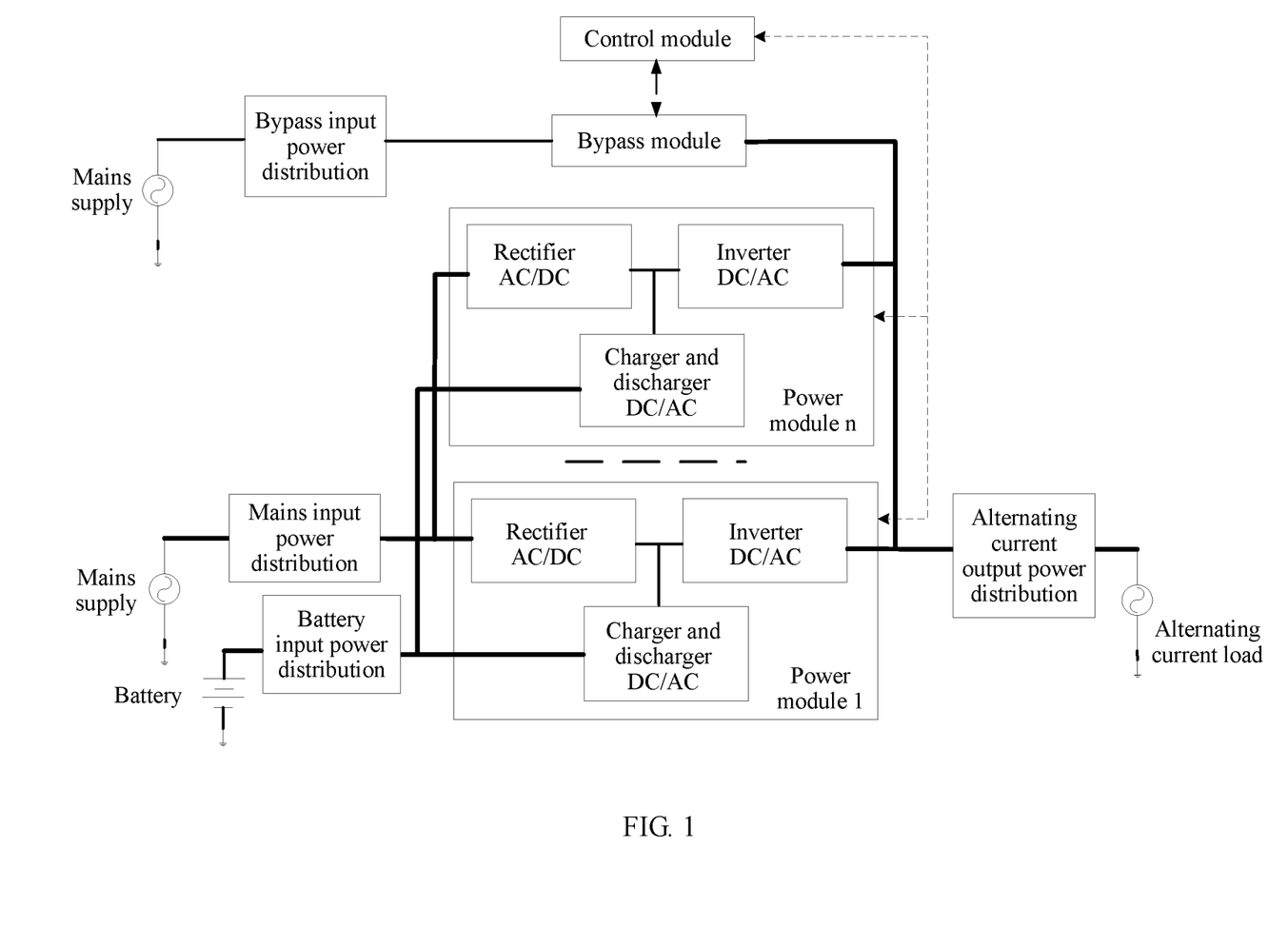
FIG. 1 is a schematic structural diagram of a modular UPS according to an embodiment of the present disclosure.

FIG. 1 is a schematic structural diagram of a modular UPS according to an embodiment of the present disclosure. As shown in FIG. 1, the modular UPS in this embodiment of the present disclosure includes power modules, a bypass module, and a control module. The control module is connected to the power modules and the bypass module.

The power modules are a core part of the modular UPS, and implement a power charging function. There may be a plurality of power modules. For example, as shown in FIG. 1, 1-n modules are in a redundant parallel connection, and n is a positive integer.

The bypass module is a static bypass of the modular UPS. The bypass module may be distributed in the power modules, or be integrated in one module. FIG. 1 shows a scenario in which the bypass module is integrated in one single module. The bypass module in this embodiment of the present disclosure may be specifically a static transfer switch (STS).

The control module implements functions on the modular UPS, such as control, display, communication, and parallel operation. The control module may be connected to the bypass module and the power modules by using leads, to implement control over the bypass module and the power modules.

FIG. 1 further shows power distribution modules, including bypass input power distribution, mains input power distribution, battery input power distribution, and alternating current output power distribution. The power distribution modules and the modular UPS together constitute a modular UPS system. The power distribution modules may be internally provided with an input switch, an output switch, a battery switch, and a power wiring port, and may further include a filter and a lightning-protection component.

In this embodiment of the present disclosure, the power modules in the modular UPS may work in various working modes. The working modes in this embodiment of the present disclosure include but are not limited to a mains power supply mode, a battery power supply mode, a feedback mode, and a charging mode. The following further describes the working modes in embodiments of the present disclosure with reference to FIG. 2A to FIG. 2D.

Figure 2A:
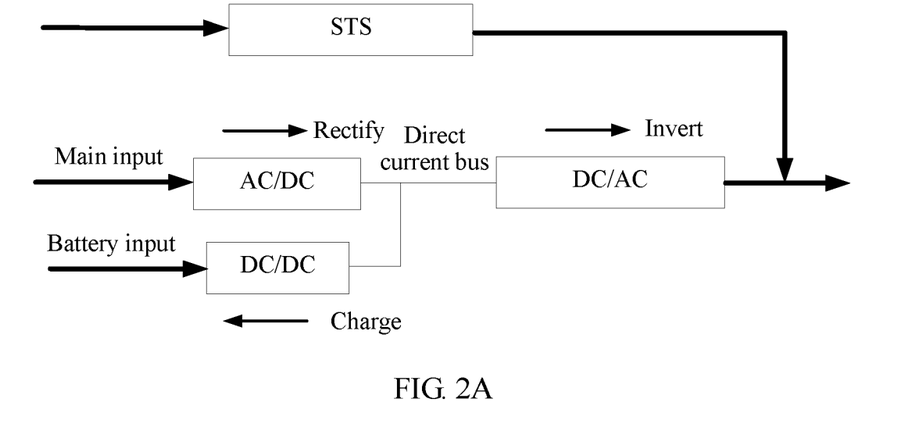
FIG. 2A shows a schematic diagram of a power module in a mains power supply mode.

FIG. 2A shows a schematic diagram of a power module in the mains power supply mode. As shown in FIG. 2A, when a mains supply is normal, a mains supply current passes through an AC/DC (alternating current/direct current) circuit, to rectify an alternating current into a direct current for transmission on a direct current bus, and the direct current passes through a DC/AC (direct current/alternating current) circuit, to invert the direct current into an alternating current, and the alternating current is output to a load. In addition, the direct current transmitted on the direct current bus passes through a DC/DC circuit to charge a battery.

Figure 2B:
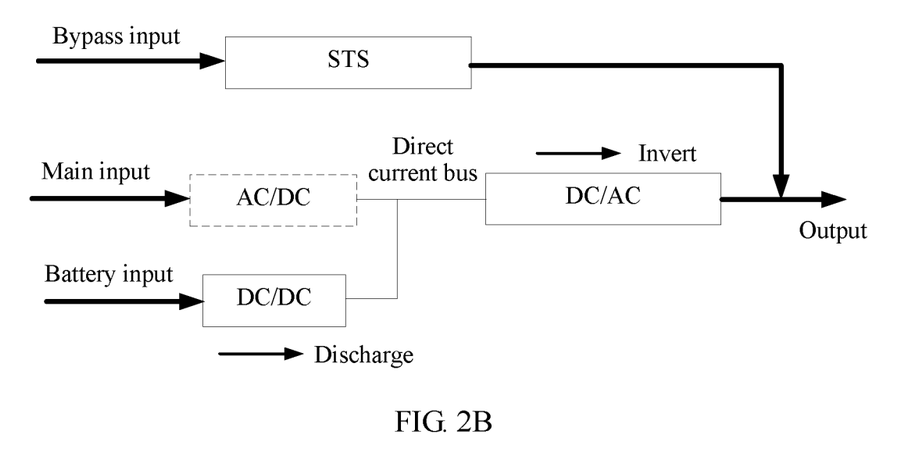
FIG. 2B shows a schematic diagram of a power module in a battery power supply mode.

FIG. 2B shows a schematic diagram of a power module in the battery power supply mode. As shown in FIG. 2B, a battery may supply electricity when a mains supply is abnormal. In this case, a power mode is in the battery power supply mode. In the battery power supply mode, an AC/DC circuit does not function, a mains supply current that is input by the battery passes through a DC/DC (direct current/direct current) circuit and is converted into a direct current for transmission on a direct current bus, and then the direct current passes through a DC/AC circuit and is inverted into an alternating current, and the alternating current is output to a load.

Figure 2C:
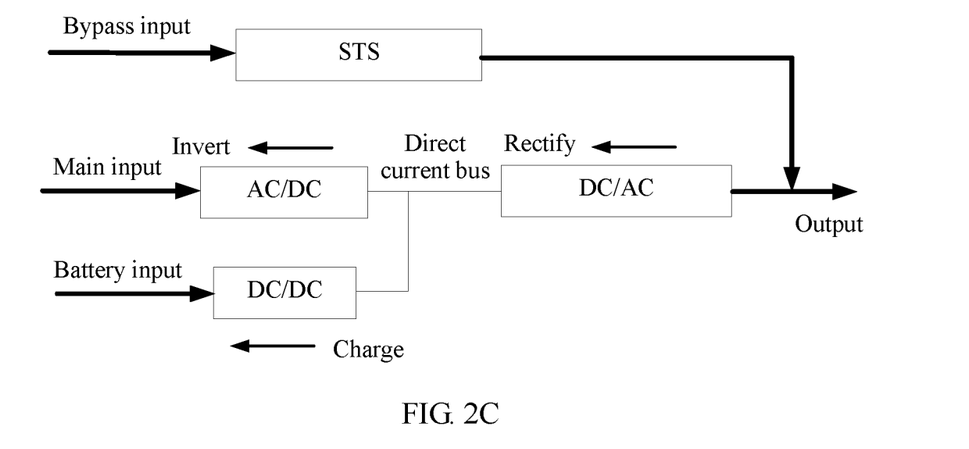
FIG. 2C shows a schematic diagram of a power module in a feedback mode.

FIG. 2C shows a schematic diagram of a power module in the feedback mode. As shown in FIG. 2C, a scenario of the feedback mode is contrary to that of the mains power supply mode. In the feedback mode, an alternating current from a load passes through a DC/AC circuit and is rectified into a direct current for transmission on a direct current bus, then the direct current passes through an AC/DC circuit and is inverted into an alternating current, and the alternating current is finally fed back to a power grid. This function is used for an energy feedback load, such as a motor. The feedback mode may be used for recycling and reusing energy, to save energy and improve reliability.

Figure 2D:
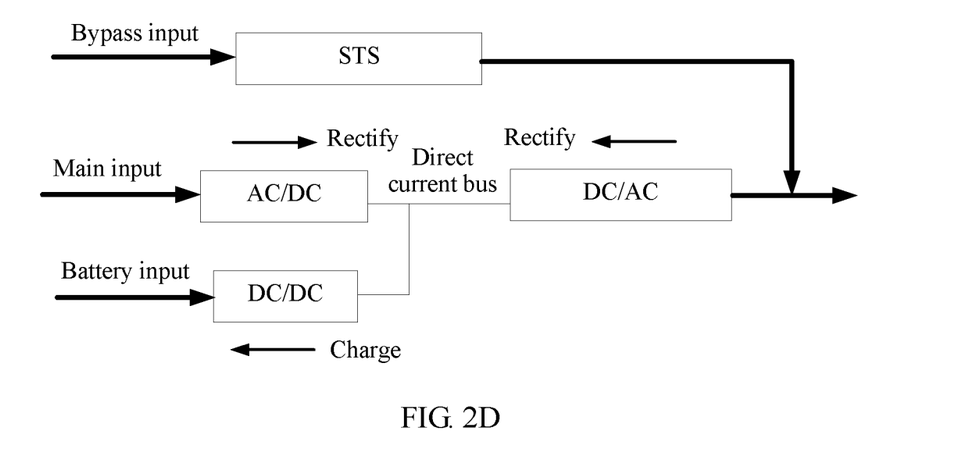
FIG. 2D shows a schematic diagram of a power module in a charging mode.

FIG. 2D shows a schematic diagram of a power module in the charging mode. As shown in FIG. 2D, in the charging mode, a function of an AC/DC circuit is the same as that of a DC/AC circuit. The AC/DC circuit rectifies an alternating current that comes from an input power grid into a direct current for transmission on a direct current bus, the DC/AC circuit rectifies an alternating current that comes from a load into a direct current for transmission on the direct current bus, and the direct current passes through a DC/DC circuit to charge a battery. Because the two circuits (that is, the AC/DC circuit and the DC/AC circuit) simultaneously convert alternating currents into direct lines, input power for charging may be doubled, thereby increasing charging power, and implementing a large-power charging function.

It should be noted herein that, a battery may also be charged in the mains power supply mode and the feedback mode, but charging power in the two modes is relatively small compared with that in the charging mode. The charging mode mentioned in this embodiment of the present disclosure is the large-power charging mode shown in FIG. 2D, rather than the mains power supply mode or the feedback mode.

FIG. 3 is a flowchart of a working method of a modular UPS according to an embodiment of the present disclosure. Referring to FIG. 3, the working method of a modular UPS provided in this embodiment of the present disclosure may include the following steps.

Figure 3A:
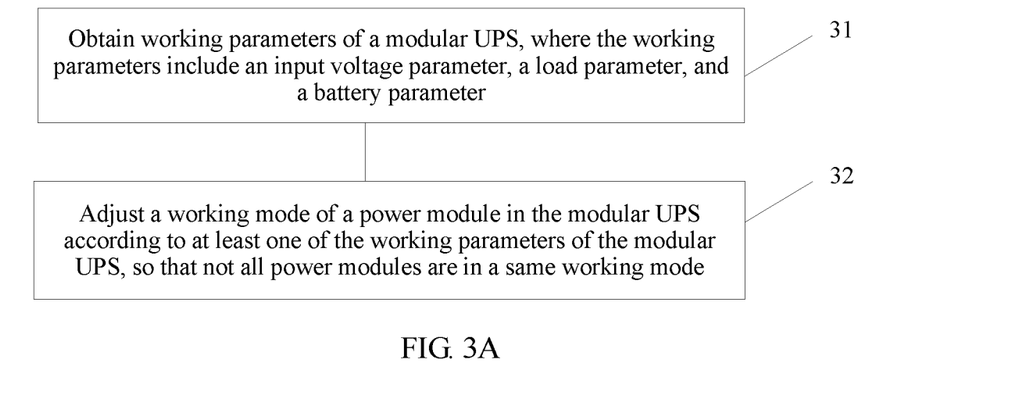
FIG. 3A is a flowchart of a working method of a modular UPS according to an embodiment of the present disclosure.

31. Obtain working parameters of the modular UPS, where the working parameters include an input voltage parameter, a load parameter, and a battery parameter.

The input voltage parameter, the load parameter, the battery parameter, and the like may be external working parameters of the modular UPS. The input voltage parameter includes a voltage amplitude and a voltage frequency, the battery parameter includes a remaining battery capacity, a rated capacity of a battery, a nominal voltage, an internal resistance, an end-of-discharge voltage, an end-of-charge voltage, and the like. The load parameter includes a load capacity and a load type. The load type may include an energy feedback load and a non-energy feedback load. Examples of the non-energy feedback load include but are not limited to a resistor, an inductor, and a capacitor, and examples of the energy feedback load include but are not limited to a motor. In this embodiment of the present disclosure, an internal working parameter such as a quantity of power modules may be further obtained.

As shown in FIG. 1, in this embodiment of the present disclosure, one end of the modular UPS is connected to a power grid that provides a mains supply, and the other end is connected to a load. The modular UPS may learn of the internal working parameter and the external working parameter of the modular UPS by using various internal circuits. For example, when the mains supply from the power grid is input to the modular UPS, the modular UPS may learn of information such as an amplitude and a frequency of a mains input voltage by using a circuit inside the modular UPS. Similarly, when the modular UPS is connected to a load, the modular UPS may also learn of load parameter information such as a load capacity and a load type by using a circuit inside the modular UPS.

32. Adjust a working mode of a power module in the modular UPS according to at least one of the working parameters of the modular UPS, so that not all power modules are in a same working mode.

The modular UPS includes K working modules, and 2≤K. In this embodiment of the present disclosure, a quantity of power modules that are in a same working mode may be automatically adjusted according to an actual working condition, to improve utilization of the power modules to a greatest extent, thereby obtaining optimal system performance.

In this embodiment of the present disclosure, the modular UPS may adjust the working mode of the power module in the modular UPS based on the internal working parameter, adjust the working mode of the power module in the modular UPS based on the external working parameter, or adjust the working mode of the power module in the modular UPS based on the internal working parameter and the external working parameter.

Regardless of which manner is used to adjust the working mode of the power module, all the power modules may be in a same working mode after adjustment. For example, all the power modules are in a charging mode. Alternatively, not all power modules may be in a same working mode. For example, some power modules are in a mains power supply mode, and some power modules are in a battery power supply mode.

The following separately describes the different adjustment manners in detail.

(1) Adjusting the Working Mode of the Power Module Based on the Input Voltage Parameter When the modular UPS adjusts the working mode of the power module in the modular UPS based on the input voltage parameter, step 32 may be specifically: determining whether the voltage amplitude and the voltage frequency meet a preset threshold; and when it is determined that at least one of the voltage amplitude or the voltage frequency does not meet the preset threshold, adjusting a working mode of at least one power module in the modular UPS to the battery power supply mode. A quantity of the power modules that are adjusted to be in the battery power supply mode may be less than a total quantity of the power modules in the modular UPS.

Figure 3B:
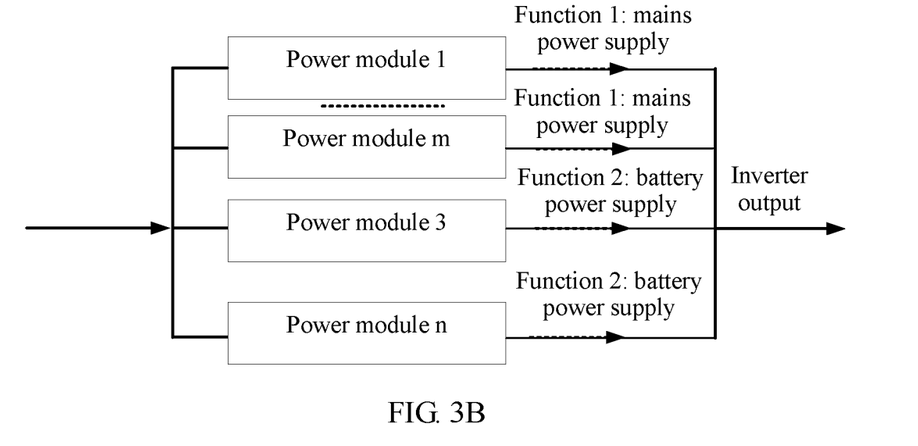
FIG. 3B to FIG. 3E are functional schematic diagrams after adjustment methods provided in embodiments of the present disclosure are applied to a modular UPS.

As shown in FIG. 3B, a power module 1 to a power module m work in mains supply inversion, and a power module 3 to a power module n work in battery inversion, to implement joint power supply of the mains supply and the battery. This adjustment manner can implement an online capacity check/health test of the battery, and also ensure that sufficient modules work in mains supply inversion, thereby ensuring system reliability.

(2) Adjusting the Working Mode of the Power Module Based on the Battery Parameter When the modular UPS adjusts the working mode of the power module in the modular UPS based on the battery parameter, step 32 may be specifically: determining whether the remaining battery capacity is less than a first threshold; and when it is determined that the remaining battery capacity is less than the first threshold, adjusting a working mode of at least one power module in the modular UPS to a charging mode. A quantity of the power modules that are adjusted to be in the charging mode may be less than a total quantity of the power modules in the modular UPS.

The first threshold may be set as required. For example, the first threshold is 10% or 20% of a total battery level.

It should be also noted that, in this specification, one power module may be corresponding to a group of batteries, or all the power modules are corresponding to a same group of batteries. When one power module is corresponding to a group of batteries, the control module may perform determining on a remaining battery capacity corresponding to each power module, and adjust the power module when the remaining battery capacity is less than the first threshold.

Figure 3C:
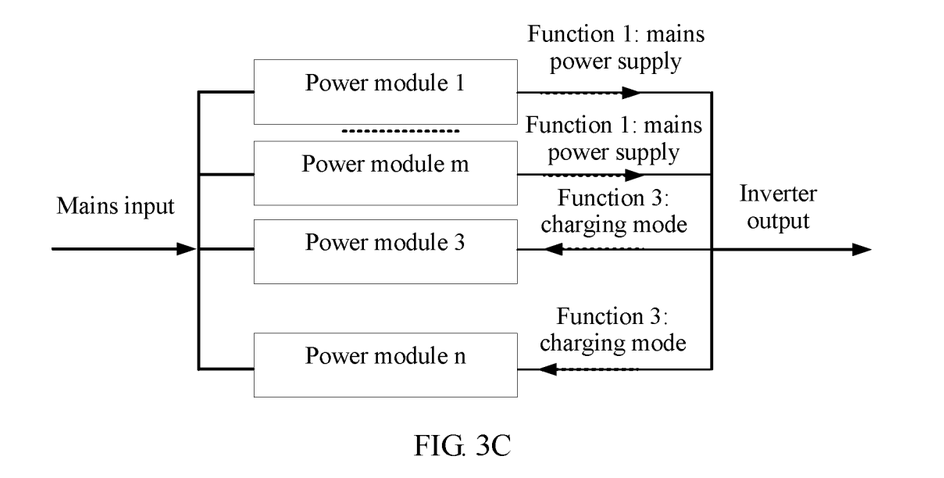

As shown in FIG. 3C, a power module 1 to a power module m work in mains supply inversion, and a power module 3 to a power module n work in the charging mode. The modular UPS implements large-power charging while this adjustment manner ensuring inversion power supply, and is suitable for a large-capacity backup power supply system and a fast charging system (a lithium battery).

(3) Adjusting the Working Mode of the Power Module Based on the Load Parameter

The load parameter may include a load capacity, a load type, and the like.

When the load parameter is the load capacity, step 32 may be specifically: determining whether the load capacity is less than a second threshold; and when it is determined that the load capacity is less than the second threshold, adjusting a working mode of at least one power module in the modular UPS to a feedback mode. A quantity of the power modules that are adjusted to be in the feedback mode may be less than a total quantity of the power modules in the modular UPS.

When the load parameter is the load type, step 32 may be specifically: determining whether an output load type is an energy feedback load, and when an output load is the energy feedback load, adjusting a working mode of at least one power module in the modular UPS to a feedback mode or a charging mode. In this way, energy fed back by the energy feedback load may be absorbed.

A typical example of the energy feedback load is a motor. When it is determined that the motor oppositely rotates, a working mode of at least one power module in the modular UPS may be adjusted to the feedback mode.

Certainly, if it is determined that the motor does not oppositely rotate, the power module may not be adjusted to be in the feedback mode.

Figure 3D:
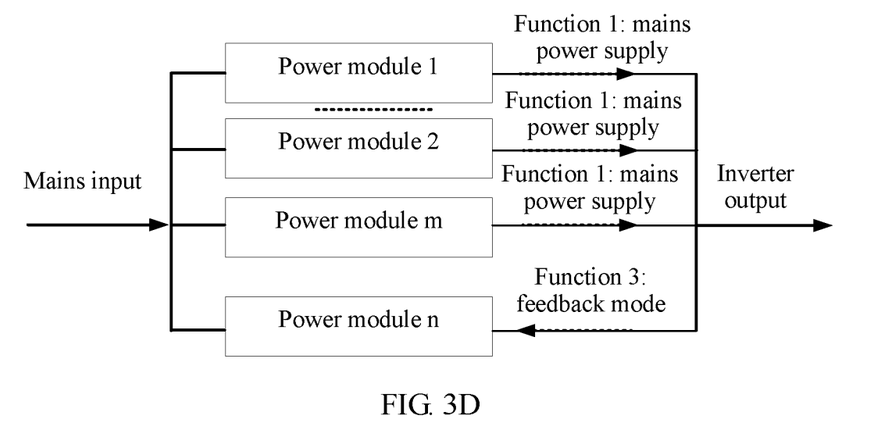

As shown in FIG. 3D, a power module 1 to a power module m work in mains supply inversion, and a power module n works in the feedback mode. In this adjustment manner, the power module n works in the feedback mode, and acts as a resistive load. This adjustment manner can resolve a problem of a cross current when a plurality of power modules are in a parallel connection and in no-load operation, so that reliability of a system in which a great many power modules are in a parallel connection is greatly improved.

(4) Adjusting the Working Mode of the Power Module Based on the Internal Working Parameter and the External Working Parameter The internal working parameter of the modular UPS includes a quantity of the power modules, and the external working parameter of the modular UPS includes an input voltage parameter, a load parameter, and a battery parameter. The input voltage parameter of a mains supply may include a voltage amplitude, a voltage frequency, and the like. The load parameter may include a load capacity, a load type, and the like. The battery parameter may include a remaining battery capacity, and the like.

Adjusting the working mode of the power module in the modular UPS according to the internal working parameter and the external working parameter of the modular UPS may include:

determining whether the voltage amplitude and the voltage frequency meet a preset threshold;

when it is determined that at least one of the voltage amplitude or the voltage frequency does not meet the preset threshold, adjusting a working mode of at least one power module in the modular UPS to a battery power supply mode, so that output of the modular UPS satisfies a power requirement of a load, where a specific quantity of the power modules that are adjusted to be in the battery power supply mode is subject to ensuring the satisfaction of the power requirement of the load, and may be less than a total quantity of the power modules in the modular UPS;

after the output of the modular UPS satisfies the power requirement of the load, determining whether a remaining power module exists in the modular UPS; and when the remaining power module exists in the modular UPS, executing the following step:

determining whether the battery capacity is less than a first threshold; and when the battery capacity is less than the first threshold, adjusting a working mode of at least one power module of the remaining power module to a charging mode; or determining whether the load capacity is less than a second threshold; and when the load capacity is less than the second threshold, adjusting a working mode of at least one power module of the remaining power module to a feedback mode; or determining whether an output load is an energy feedback load; and when the output load is the energy feedback load, adjusting a working mode of at least one power module of the remaining power module to a feedback mode or a charging mode.

It should be noted herein that, the "remaining power module" mentioned in this specification is a remaining power module in the modular UPS other than a power module that works in the mains power supply mode or the battery power supply mode to provide power for the load. For example, it is assumed that ten power modules exist in the modular UPS and are initially in the mains power supply mode. When the input voltage parameter of the mains supply is abnormal, it is assumed that six power modules are switched from the mains power supply mode to the battery power supply mode, and if output of the six power modules that are in the battery power supply mode can satisfy a power requirement of a load, the other four power modules that are in the modular UPS and that are in the mains power supply mode are redundant power supply modules; or if power output of the six power modules that are in the battery power supply mode cannot satisfy a power requirement of a load, and the power requirement of the load can be satisfied only by using power output of one more power module that is in the mains power supply mode, the other three power modules that are in the modular UPS and that are in the mains power supply mode are remaining power modules.

Figure 3E:
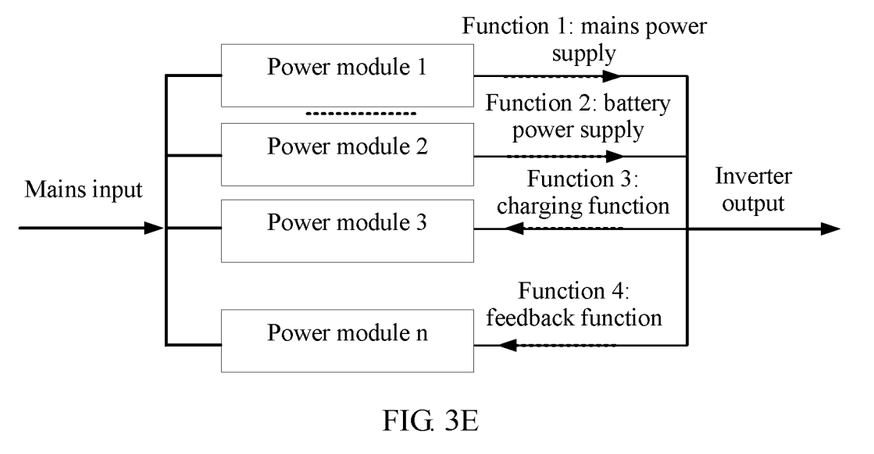

As shown in FIG. 3E, a power module 1 works in mains supply inversion, a power module 2 works in a battery mode, a power module 3 works in the charging mode, and a power module n works in the feedback mode. This adjustment manner may integrate advantages of the foregoing scenarios shown in FIG. 3B to FIG. 3D.

When the quantity of the power modules in the modular UPS is sufficient, that is, if there is still a power module with an unadjusted working mode after the working modes of the power modules are automatically adjusted in the foregoing manners, the unadjusted power module in the modular UPS may be set to be in the charging mode or the mains supply mode. Certainly, when the quantity of the power modules in the modular UPS is insufficient (for example, all the power modules in the modular UPS are in the charging mode, and there is no remaining power module), a power module with an adjusted working mode may be used for next adjustment immediately after a current task is completed. For example, after the mains input voltage is restored to the normal preset threshold, and if the battery capacity is less than the first threshold, a power module in the battery power supply mode may adjust its own working mode to the charging mode, to accelerate a charging process. For another example, after the mains input voltage is restored to the normal preset threshold, and when the load capacity is less than the second threshold, a power module in the battery power supply mode may adjust its own working mode from the battery power supply mode to the feedback mode. For another example, after the mains input voltage is restored to the normal preset threshold, and when the output load is an energy feedback load, a power module in the battery power supply mode may adjust its own working mode from the battery power supply mode to the feedback mode or the charging mode.

In the foregoing adjustment manners, the power modules in the modular UPS may be initially set to be in a mains supply mode.

In addition, when the external working parameter is changed so that the working mode of the power module does not need to be adjusted, the power module may be restored to be in a default working mode. The default working mode may be the mains power supply mode. Certainly, the default working mode may be set as required.

It should be noted that, in all the foregoing adjustment manners, a previous working mode of a power module that is adjusted to be in the battery power supply mode may be the mains supply mode, the charging mode, or the feedback mode; a previous working mode of a power module that is adjusted to be in the charging mode may be the mains supply mode, the battery power supply mode, or the feedback mode; and a previous working mode of a power module that is adjusted to be in the feedback mode may be the mains supply mode, the charging mode, or the battery power supply mode. That is, in this embodiment of the present disclosure, the working mode of the power module may be freely switched as required.

According to the working method of a modular UPS provided in this embodiment of the present disclosure, the working mode of the power module may be automatically adjusted according to the external working parameter of the modular UPS by optimizing a control solution of the modular UPS without increasing costs, so that power modules in different functional modes are grouped, thereby fully utilizing redundant modules, and improving system performance and reliability.

Figure 4A:
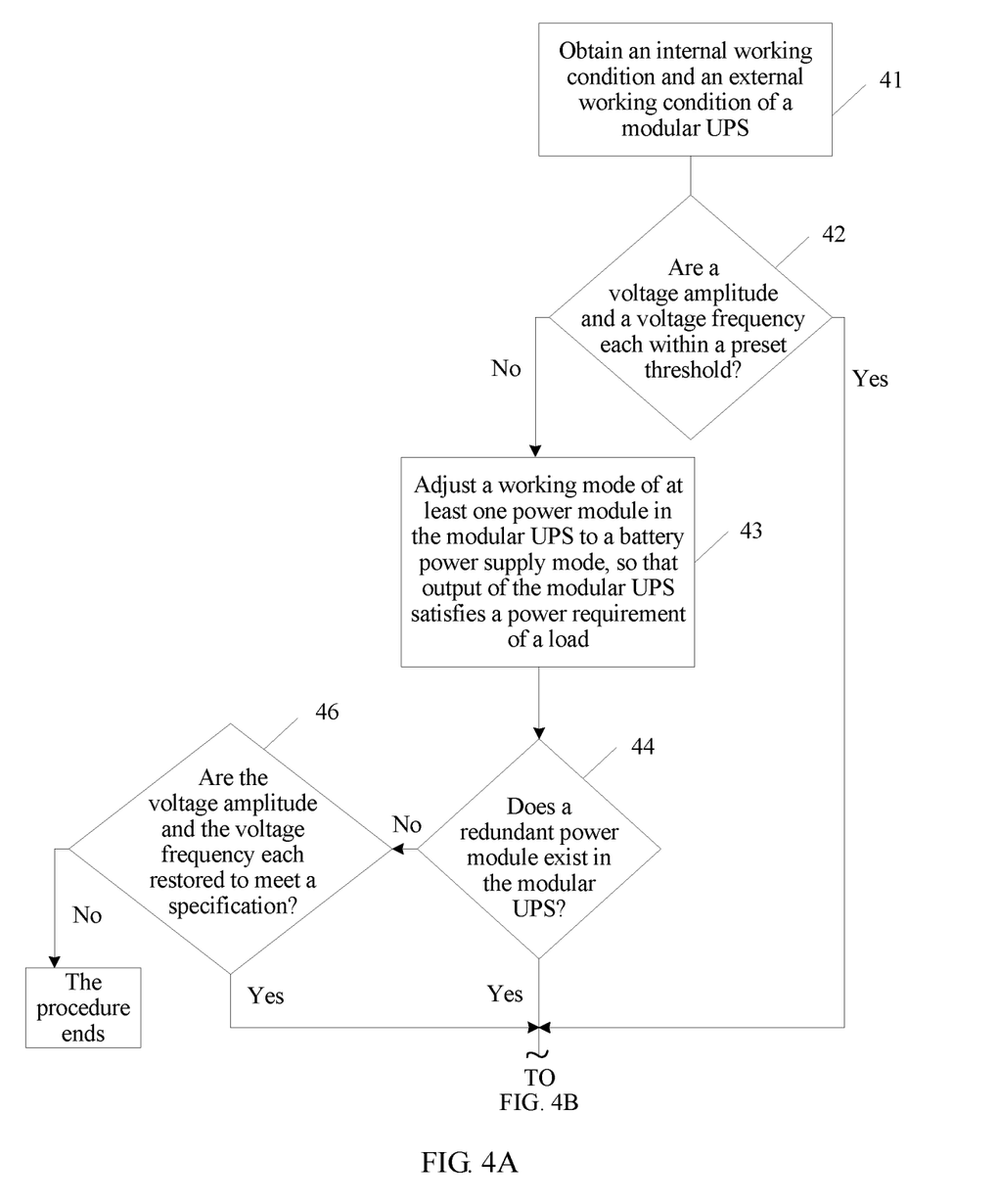
FIG. 4A and FIG. 4B are a flowchart of a working method of a modular UPS according to an embodiment of the present disclosure.
Figure 4B:
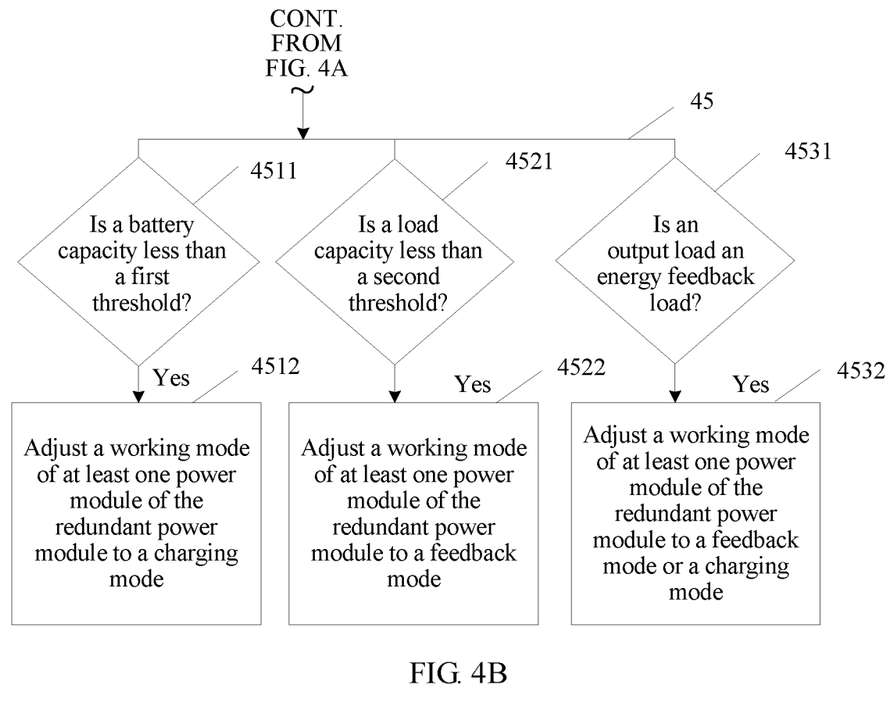

FIG. 4A and FIG. 4B are a flowchart of a working method of a modular UPS according to an embodiment of the present disclosure. Referring to FIG. 4A and FIG. 4B, the working method of a modular UPS provided in this embodiment of the present disclosure may include the following steps.

41. Obtain an internal working parameter and an external working parameter of the modular UPS. The internal working parameter includes a quantity of the power modules, and the external working parameter includes an input voltage parameter, a load parameter, and a battery parameter.

42. Determine whether a voltage amplitude and a voltage frequency meet a preset threshold. If at least one of the voltage amplitude or the voltage frequency does not meet the preset threshold, step 43 is executed; and if the voltage amplitude and the voltage frequency each meet the preset threshold, step 45 is executed.

43. When it is determined that at least one of the voltage amplitude or the voltage frequency does not meet the preset threshold, adjust a working mode of at least one power module in the modular UPS to a battery power supply mode, so that output of the modular UPS satisfies a power requirement of a load. A specific quantity of the power modules that are adjusted to be in the battery power supply mode is subject to satisfying the power requirement of the load.

Specifically, if a mains input voltage is abnormal, for example, a voltage drops down and is out of a preset threshold limit range, reliable power supply cannot be ensured. When it is detected that an input voltage is abnormal, a control module sends a command to three power unit circuits: a rectifier, an inverter, and a charger and discharger, and switches the working mode of the power module from a charging mode to the battery power supply mode.

44. Determine whether a remaining power module other than a power module that satisfies the power requirement of the load exists in the modular UPS. When the remaining power module exists in the modular UPS, step 45 is executed; and when no remaining power module exists in the modular UPS, step 46 is executed.

It should be noted herein that, the "remaining power module" mentioned in this specification is a remaining power module in the modular UPS other than a power module that works in a mains power supply mode or the battery power supply mode to provide power for the load.

45. When the remaining power module exists in the modular UPS, execute the following steps:

4511. Determine whether a battery capacity is less than a first threshold.

4512. When the battery capacity is less than the first threshold, adjust a working mode of at least one power module of the remaining power module to a charging mode.

4521. Determine whether a load capacity is less than a second threshold.

4522. When the load capacity is less than the second threshold, adjust a working mode of at least one power module of the remaining power module to a feedback mode.

4531. Determine whether an output load is an energy feedback load.

4532. When the output load is the energy feedback load, adjust a working mode of at least one power module of the remaining power module to a feedback mode or a charging mode.

It should be noted that, step 4511, step 4521, and step 4531 are parallel without a sequence. During execution, any one of step 4511, step 4521 or step 4531 may be selected as required and be executed first. For example, step 4531 may be first selected for execution. When it is determined in step 4531 that the output load is the energy feedback load, step 4532 may be executed, and when the output load is not the energy feedback load, either of step 4511 and step 4521 may be selected for first execution. Assuming that step 4521 is selected, if it is determined in step 4521 that the load capacity is less than the second threshold, step 4522 may be executed. If it is determined in step 4521 that the load capacity is no less than the second threshold, step 4511 may be executed. If it is determined in step 4511 that the battery capacity is less than the first threshold, step 4512 may be executed. If it is determined in step 4511 that the battery capacity is no less than the first threshold, the remaining power module may be set to be in any working mode as required, such as the mains supply working mode.

Similarly, step 4511 may also be executed first. When it is determined in step 4511 that the battery capacity is less than the first threshold, step 4512 may be executed, and when the battery capacity is no less than the first threshold, either of step 4521 and step 4531 may be selected for first execution. Assuming that step 4521 is selected, if it is determined in step 4521 that the load capacity is less than the second threshold, step 4522 may be executed. If it is determined in step 4521 that the load capacity is no less than the second threshold, step 4531 may be executed. If it is determined in step 4531 that the output load is the energy feedback load, step 4532 is executed. If it is determined in step 4531 that the output load is not the energy feedback load, the remaining power module may be set to be in any working mode as required, such as the mains supply working mode.

46. If no remaining power module exists in the modular UPS, determine whether the voltage amplitude and the voltage frequency are restored to meet the preset threshold. When the voltage amplitude or the voltage frequency is not restored to meet the preset threshold, a procedure ends; and when the voltage amplitude and the voltage frequency are restored to meet the preset threshold, step 4511, step 4521, or step 4531 is executed, that is, any one of the following steps is executed:

determining whether the battery capacity is less than the first threshold, and when the battery capacity is less than the first threshold, adjusting a working mode of at least one power module from the battery power supply mode to the charging mode; or determining whether the load capacity is less than the second threshold, and when the load capacity is less than the second threshold, adjusting a working mode of at least one power module from the battery power supply mode to the feedback mode; or determining whether the output load is the energy feedback load, and when the output load is the energy feedback load, adjusting a working mode of at least one power module from the battery power supply mode to the feedback mode or the charging mode.

In addition, it should be noted that, in this embodiment of the present disclosure, when the voltage amplitude and the voltage frequency are restored to meet the preset threshold, a power module in the battery power supply mode may be adjusted to be in the mains power supply mode; when the battery capacity is restored to be no less than the first threshold, a power module in the charging mode may be adjusted to be in the mains power supply mode; and when the load capacity is changed to be no less than the second threshold, a power module in the feedback mode may be adjusted to be in the mains power supply mode.

According to the working method of a modular UPS provided in this embodiment of the present disclosure, the working mode of the power module is flexibly adjusted according to the quantity of the power modules in the modular UPS, so as to ensure that the power modules in the modular UPS can work in different modes and can be freely grouped, thereby utilizing the power modules to a greatest extent, and improving system performance and reliability.

Referring to FIG. 1, an embodiment of the present disclosure provides a modular UPS, including power modules, a bypass module, and a control module. The control module is connected to the power modules and the bypass module. The control module is configured to obtain working parameters of the modular UPS; and adjust a working mode of a power module in the modular UPS according to the working parameters of the modular UPS, so that not all power modules are in a same working mode.

For a specific process in which the control module adjusts the working mode of the power module in the modular UPS, refer to description in the foregoing context, and details are not described herein again.

According to the modular UPS provided in this embodiment of the present disclosure, the working mode of the power module in the modular UPS is adjusted according to the working parameters, so that not all power modules are in a same working mode. In this way, the power modules in the modular UPS can be fully utilized, thereby improving system performance of the modular UPS.

It should be noted that, the modular UPS provided in the foregoing embodiment is described only by using division of the foregoing functional modules as an example. In practice, the foregoing functions may be allocated to different functional modules for implementation as required. That is, an internal structure of the UPS is divided into different functional modules to implement all or some of the functions described above. In addition, the modular UPS provided in the foregoing embodiments pertains to a same concept as embodiments of the working method of a modular UPS. For a specific implementation process of the modular UPS, refer to the method embodiments, and details are not described herein again.

It should be noted that embodiments in this specification are described in a progressive manner, each embodiment focuses on a difference from other embodiments, and for same or similar parts in the described embodiments, a previous embodiment may be referenced. An apparatus embodiment may be similar to a method embodiment, and therefore may be described briefly. For related parts, reference may be made to partial descriptions in the method embodiment.

It should be noted that, in this specification, the terms "include", "comprise", or any other variant is intended to cover a non-exclusive inclusion, so that a process, a method, an article, or an apparatus that includes a list of elements not only includes those elements but also includes other elements which are not expressly listed, or further includes elements inherent to such process, method, article, or apparatus. An element preceded by "includes a . . . " does not, without more constraints, preclude the existence of additional identical elements in the process, method, article, or apparatus that includes the element.

A person of ordinary skill in the art may understand that all or some of the steps of embodiments may be implemented by hardware or a program instructing related hardware. The program may be stored in a computer-readable storage medium. The storage medium may include: a read-only memory, a magnetic disk, or an optical disc.

The foregoing descriptions are merely examples of embodiments of the present disclosure, but are not intended to limit the present disclosure. Any modification, equivalent replacement, and improvement made without departing from the spirit and principle of the present disclosure may fall within the protection scope of the present disclosure.

What is claimed is:

1. A method for operating a modular uninterruptible power supply (UPS), wherein the method comprises:
    obtaining working parameters of the modular UPS, wherein the working parameters comprise an input voltage parameter, a load parameter, and a battery parameter;
    determining whether the input voltage parameter meets a preset threshold, wherein the input voltage parameter comprises a voltage amplitude and a voltage frequency;
    based on at least one of the voltage amplitude or the voltage frequency not meeting the preset threshold, adjusting working modes of S power modules of K power modules in the modular UPS to a battery power supply mode such that an output of the modular UPS satisfies a power requirement of a load, wherein K is a total quantity of the power modules in the modular UPS, and $1 \leq S < K$;
    determining whether one or more remaining power modules other than one or more power modules that provide power for the load exist in the modular UPS; and
    based on one or more remaining power modules existing in the modular UPS, executing at least one of the following steps:
        determining whether the battery parameter is less than a first threshold, wherein the battery parameter comprises a remaining battery capacity; and based on the remaining battery capacity being less than the first threshold, adjusting a working mode of at least one power module of the one or more remaining power modules to a charging mode; or
        determining whether the load parameter is less than a second threshold, wherein the load parameter comprises a load capacity; and based on the load capacity being less than the second threshold, adjusting a working mode of at least one power module of the one or more remaining power modules to a feedback mode; or
        determining whether an output load type indicated by the load parameter is an energy feedback load, wherein the load parameter comprises the output load type; and based on the output load type being the energy feedback load, adjusting a working mode of at least one power module of the one or more remaining power modules to a feedback mode or a charging mode.

2. The method according to claim 1, wherein the power modules in the modular UPS are initially in a mains power supply mode, and the method further comprises:
- based on the voltage amplitude and the voltage frequency being restored to meet the preset threshold, adjusting a power module in the battery power supply mode to be in the mains power supply mode; or
- based on the remaining battery capacity being restored to be not less than the first threshold, adjusting a power module in the charging mode to be in the mains power supply mode; or
- based on the load capacity being changed to be not less than the second threshold, adjusting a power module in the feedback mode to be in the mains power supply mode.

3. The method according to claim 1, wherein the method further comprises:
- based on no remaining power module existing in the modular UPS, and the voltage amplitude and the voltage frequency being restored to meet the preset threshold, executing at least one of the following steps:
  - determining whether the remaining battery capacity is less than the first threshold, and based on the remaining battery capacity being less than the first threshold, adjusting a working mode of at least one power module from the battery power supply mode to the charging mode; or
  - determining whether the load capacity is less than the second threshold, and based on the load capacity being less than the second threshold, adjusting a working mode of at least one power module from the battery power supply mode to the feedback mode; or
  - determining whether the output load type indicated by the load parameter is an energy feedback load, and based on the output load type being the energy feedback load, adjusting a working mode of at least one power module from the battery power supply mode to the feedback mode or the charging mode.

4. A method for operating a modular uninterruptible power supply (UPS), wherein the method comprises:
- obtaining working parameters of the modular UPS, wherein the working parameters comprise an input voltage parameter, a load parameter, and a battery parameter; and
- adjusting a working mode of at least one power module in the modular UPS according to at least one of the working parameters of the modular UPS such that not all power modules of the modular UPS are in a same working mode, wherein the modular UPS comprises K power modules, and 2≤K.

5. The method according to claim 4, wherein adjusting the working mode of the at least one power module in the modular UPS according to at least one of the working parameters of the modular UPS comprises:
- determining whether the input voltage parameter meets a preset threshold, wherein the input voltage parameter comprises a voltage amplitude and a voltage frequency; and
- based on at least one of the voltage amplitude or the voltage frequency not meeting the preset threshold, adjusting working modes of L power modules of the K power modules in the modular UPS to a battery power supply mode, wherein K is a total quantity of the power modules in the modular UPS, and 1≤L<K.

6. The method according to claim 4, wherein adjusting the working mode of the at least one power module in the modular UPS according to at least one of the working parameters of the modular UPS comprises:
- determining whether the battery parameter is less than a first threshold, wherein the battery parameter comprises a remaining battery capacity; and
- based on the remaining battery capacity being less than the first threshold, adjusting working modes of P power modules of the K power modules in the modular UPS to a charging mode, wherein K is a total quantity of the power modules in the modular UPS, and 1≤P<K.

7. The method according to claim 4, wherein adjusting the working mode of the at least one power module in the modular UPS according to at least one of the working parameters of the modular UPS comprises:
- determining whether the load parameter is less than a second threshold, wherein the load parameter comprises a load capacity; and
- based on the load capacity being less than the second threshold, adjusting working modes of Q power modules of the K power modules in the modular UPS to a feedback mode, wherein K is a total quantity of the power modules in the modular UPS, and 1≤Q<K.

8. The method according to claim 4, wherein adjusting the working mode of the at least one power module in the modular UPS according to at least one of the working parameters of the modular UPS comprises:
- determining whether an output load type indicated by the load parameter is an energy feedback load, wherein the load parameter comprises the output load type, and based on the output load type being the energy feedback load, adjusting working modes of R power modules of the K power modules in the modular UPS to a feedback mode or a charging mode, wherein K is a total quantity of the power modules in the modular UPS, and 1≤R<K.

9. The method according to claim 4, wherein working modes for power supplies of the modular UPS comprise a battery power supply mode, a mains power supply mode, a feedback mode, and a charging mode.

10. A modular uninterruptible power supply (UPS), comprising:
- power modules;
- a bypass module; and
- a control module, wherein the control module is connected to the power modules and the bypass module;
- wherein the control module is configured to:
  - obtain working parameters of the modular UPS, wherein the working parameters comprise an input voltage parameter, a load parameter, and a battery parameter;
  - determine whether the input voltage parameter meets a preset threshold, wherein the input voltage parameter comprises a voltage amplitude and a voltage frequency;
  - based on at least one of the voltage amplitude or the voltage frequency not meeting the preset threshold, adjust working modes of S power modules of K power modules in the modular UPS to a battery power supply mode such that output of the modular UPS satisfies a power requirement of a load, wherein K is a total quantity of the power modules in the modular UPS, and 1≤S<K;
  - determine whether one or more remaining power modules other than one or more power modules that provide power for the load exist in the modular UPS; and
  - based on one or more remaining power modules existing in the modular UPS, execute at least one of the following steps:

determining whether the battery parameter is less than a first threshold, wherein the battery parameter comprises a remaining battery capacity; and based on the remaining battery capacity being less than the first threshold, adjusting a working mode of at least one power module of the one or more remaining power modules to a charging mode; or determining whether the load parameter is less than a second threshold, wherein the load parameter comprises a load capacity; and based on the load capacity being less than the second threshold, adjusting a working mode of at least one power module of the one or more remaining power modules to a feedback mode; or determining whether an output load type indicated by the load parameter is an energy feedback load, wherein the load parameter comprises the output load type; and based on the output load type being the energy feedback load, adjusting a working mode of at least one power module of the one or more remaining power modules to a feedback mode or a charging mode.

11. The modular UPS according to claim 10, wherein the power modules in the modular UPS are configured to initially be in a mains power supply mode, and the control module is further configured to:

based on the voltage amplitude and the voltage frequency being restored to meet the preset threshold, adjust a power module in the battery power supply mode to be in the mains power supply mode; or based on the remaining battery capacity being restored to be not less than the first threshold, adjust a power module in the charging mode to be in the mains power supply mode; or based on the load capacity being changed to be not less than the second threshold, adjust a power module in the feedback mode to be in the mains power supply mode.

12. The modular UPS according to claim 10, wherein the control module is further configured to:

based on no remaining power module existing in the modular UPS, and the voltage amplitude and the voltage frequency being restored to meet the preset threshold, execute at least one of the following steps:

determining whether the remaining battery capacity is less than the first threshold, and based on the remaining battery capacity being less than the first threshold, adjusting a working mode of at least one power module from the battery power supply mode to the charging mode; or determining whether the load capacity is less than the second threshold, and based on the load capacity being less than the second threshold, adjusting a working mode of at least one power module from the battery power supply mode to the feedback mode; or determining whether the output load type indicated by the load parameter is an energy feedback load, and based on the output load type being the energy feedback load, adjusting a working mode of at least one power module from the battery power supply mode to the feedback mode or the charging mode.

13. A modular uninterruptible power supply (UPS), comprising:
power modules;
a bypass module; and
a control module, wherein the control module is connected to the power modules and the bypass module;

wherein the control module is configured to:
obtain working parameters of the modular UPS, wherein the working parameters comprise an input voltage parameter, a load parameter, and a battery parameter; and adjust a working mode of at least one power module in the modular UPS according to at least one of the working parameters of the modular UPS such that not all power modules of the modular UPS are in a same working mode, wherein the modular UPS comprises K power modules, and 2≤K.

14. The modular UPS according to claim 13, wherein adjusting the working mode of the at least one power module in the modular UPS according to at least one of the working parameters of the modular UPS comprises:

determining whether the input voltage parameter meets a preset threshold, wherein the input voltage parameter comprises a voltage amplitude and a voltage frequency; and based on at least one of the voltage amplitude or the voltage frequency not meeting the preset threshold, adjusting working modes of L power modules of the K power modules in the modular UPS to a battery power supply mode, wherein K is a total quantity of the power modules in the modular UPS, and 1≤L<K.

15. The modular UPS according to claim 13, wherein adjusting the working mode of the at least one power module in the modular UPS according to at least one of the working parameters of the modular UPS comprises:

determining whether the battery parameter is less than a first threshold, wherein the battery parameter comprises a remaining battery capacity; and based on the remaining battery capacity being less than the first threshold, adjusting working modes of P power modules of the K power modules in the modular UPS to a charging mode, wherein K is a total quantity of the power modules in the modular UPS, and 1≤P<K.

16. The modular UPS according to claim 13, wherein adjusting the working mode of the at least one power module in the modular UPS according to at least one of the working parameters of the modular UPS comprises:

determining whether the load parameter is less than a second threshold, wherein the load parameter comprises a load capacity; and based on the load capacity being less than the second threshold, adjusting working modes of Q power modules of the K power modules in the modular UPS to a feedback mode, wherein K is a total quantity of the power modules in the modular UPS, and 1≤Q<K.

17. The modular UPS according to claim 13, wherein adjusting the working mode of the at least one power module in the modular UPS according to at least one of the working parameters of the modular UPS comprises:

determining whether an output load type indicated by the load parameter is an energy feedback load, wherein the load parameter comprises the output load type; and based on the output load type being the energy feedback load, adjusting working modes of R power modules of the K power modules in the modular UPS to a feedback mode or a charging mode, wherein K is a total quantity of the power modules in the modular UPS, and 1≤R<K.

18. The modular UPS according to claim 13, wherein working modes for power supplies of the modular UPS comprise a battery power supply mode, a mains power supply mode, a feedback mode, and a charging mode.

* * * * *

UNITED STATES PATENT AND TRADEMARK OFFICE
CERTIFICATE OF CORRECTION

PATENT NO. : 11,245,282 B2
APPLICATION NO. : 16/426922
DATED : February 8, 2022
INVENTOR(S) : Zhang Page 1 of 1

It is certified that error appears in the above-identified patent and that said Letters Patent is hereby corrected as shown below:

On the Title Page

Column 2, Foreign Patent Documents, Citation 5: "GN 103166301 A 6/2013" should read -- CN 103166301 A 6/2013 --.

Signed and Sealed this
Twenty-fourth Day of May, 2022

Katherine Kelly Vidal
*Director of the United States Patent and Trademark Office*